United States Patent [19]
Alfano et al.

[11] Patent Number: 5,126,874
[45] Date of Patent: Jun. 30, 1992

[54] METHOD AND APPARATUS FOR CREATING TRANSIENT OPTICAL ELEMENTS AND CIRCUITS

[76] Inventors: Robert R. Alfano, 3777 Independence Ave., Bronx; Yao Li, 3605 Sedgwick Ave., New York, both of N.Y. 10463; P. L. Baldeck, 28 Avenue M. Cachin, 38400 Saint Martin D'Héres, France

[21] Appl. No.: 552,677

[22] Filed: Jul. 11, 1990

[51] Int. Cl.⁵ .......................... G02F 1/01; G02F 1/03
[52] U.S. Cl. .................... 359/240; 359/241; 359/244
[58] Field of Search ............ 350/354, 163; 359/240, 359/241, 244

[56] References Cited

U.S. PATENT DOCUMENTS

| | | |
|---|---|---|
| 3,743,423 | 7/1973 | Heinz et al. ............ 350/162.12 |
| 4,496,222 | 1/1985 | Shah ........................ 350/354 |
| 4,585,301 | 4/1986 | Bialkowski ................ 350/354 |
| 4,673,250 | 6/1987 | Roberts et al. ............ 350/1.5 |
| 4,921,336 | 5/1990 | Dagenais et al. ........ 350/354 |
| 4,960,322 | 10/1990 | Khoshnevisan et al. .... 350/354 |

Primary Examiner—Eugene R. LaRoche
Assistant Examiner—Evelyn A. Lester
Attorney, Agent, or Firm—Kriegsman & Kriegsman

[57] ABSTRACT

A transient optical element is created by providing a body of a third order non-linear material and then passing a pulse of light through the body of non-linear material. The pulse of light has a cross-sectional area corresponding to the cross-sectional area of the transient optical element to be created and power sufficient to induce an index of refraction change over the portion of the body of non-linear material through which it passes. The portion of the body of non-linear material having the induced index of refraction change constitutes the transient optical element with the duration of the transient optical element depending on the response time of the non-linear material and the duration of pulse of light. Typical optical elements that can be so created include prisms, lenses, gratings, mirrors, beamsplitters and wave guides. By forming a plurality of optical elements within the third order non-linear material rather than simply a single optical element, a transient optical circuit can be created.

16 Claims, 4 Drawing Sheets

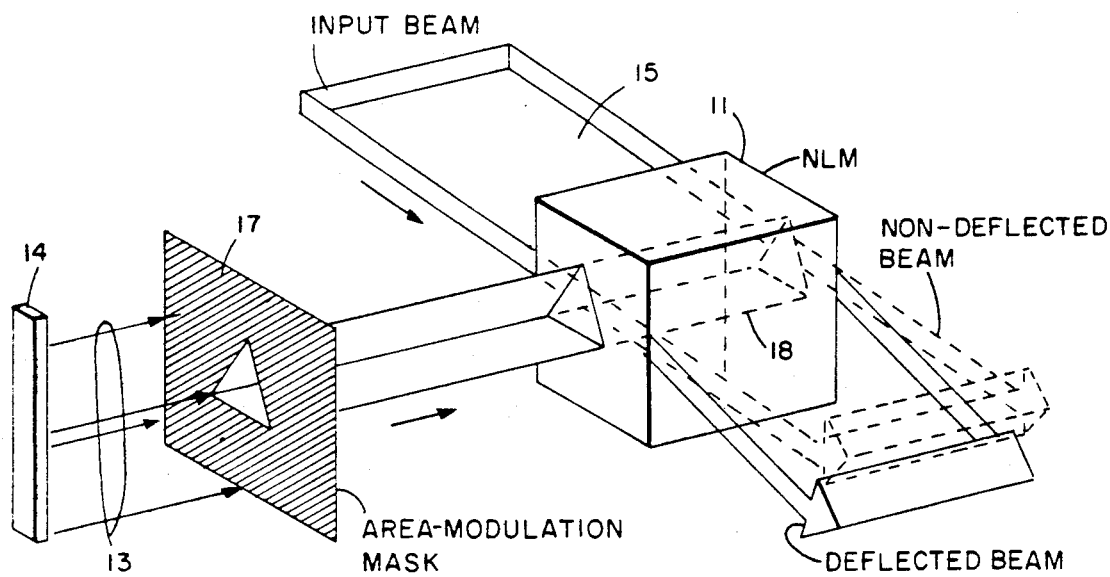
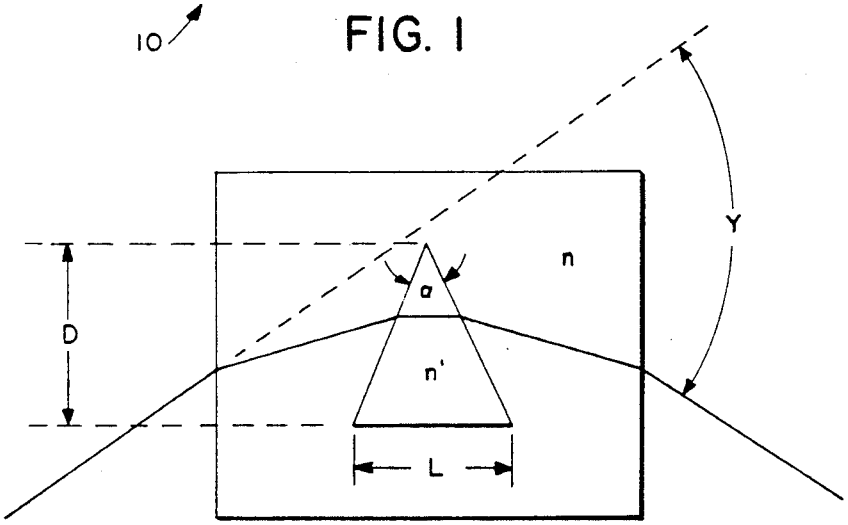
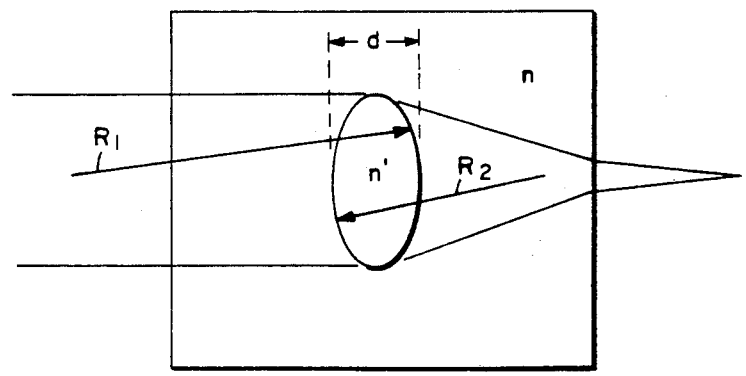

METHOD AND APPARATUS FOR CREATING TRANSIENT OPTICAL ELEMENTS AND CIRCUITS

BACKGROUND OF THE INVENTION

The present invention relates generally to optical elements and circuits and more particularly to a method and apparatus for creating transient optical elements and circuits.

Optical processing has been suggested for ultrafast speed and ultralarge bandwidth signal processing and computation systems. Based on the fast switching, parallel and free-space interconnect capabilities of optics, research has been conducted to implement various types of optical switches and modulators. An important class of optical modulators is the so-called optical beam deflector which employs a combination of optical switching and interconnection. Various acousto-optic and electro-optic type of deflectors have been developed. Because of their hybrid signal format, however their deflection speed is limited to the nanosecond range. It has been suggested that in order to achieve higher processing speed, all-optical deflection schemes must be utilized. All optical deflection techniques are known. For example, the use of a dynamic grating formed by an interference of two coherent ultrashort laser pulses inside a third order nonlinear medium offers a picosecond beam deflection speed. A serious problem with the induced grating beam deflection approach based on interference, however, is that the deflected (1st order diffraction) beam energy is too weak as compared to its undeflected (0th order diffraction) counterpart.

The following references are considered of interest.

A. Yariv and P. C. Yeh, Optical Waves in Crystals, (Wiley, New York, 1983) ch. 8-10.

Acousto-Optic Signal Processing, ed. N. J. Berg and J. N. Lee, (Marcel Dekker, New York, 1983).

Laser Induced Dynamic Gratings, ed. H. J. Eichler, P. Gunter, and D. Pohl, (Springer Verlag, New York, 1986).

D. H. Auston et. al. "Research on nonlinear optical materials an assessment," Appl. Opt. (1987).

Nonlinear Optics, A Lecture Note and Reprint Volume, N. Bloembergen Harvard University, W. A. Benjamin Advanced Book Program, Reading, Massachusetts, pp. 1-3, 1965.

Optical Fiber Telecommunications, Academic Press, Chapter 17, Modulation Techniques, I. P. Kaminow and T. Li, pp. 575-589, 1979.

Ultrafast Laser Spectroscopy, Semiconductor Probe Picosecond Kerr Gate, Volume 2, Academic Press, pp. 409-439.

Applied Physics Letters 15, p. 192, Duguay annd Hanson, 1969.

As can be appreciated, the need exists for a new and improved technique for creating transient optical elements.

It is an object of this invention to provide a new and improved apparatus for creating transient optical elements.

It is another object of this invention to provide a new and improved method of creating transient optical elements.

It is still another object of this invention to provide a new and improved method of creating transient optical circuits.

It is yet still another object of this invention to provide a new and improved apparatus for creating transient optical circuits.

It is a further object of this invention to provide a method and apparatus for creating all-optical beam deflectors.

It is still a further object of this invention to provide a method and apparatus for creating all-optical beam modulators.

It is a yet still a further object of this invention to provide a new and improved method and apparatus for creating ultrafast transient optical elements and circuits.

SUMMARY OF THE INVENTION

A method of creating a transient optical element according to this invention comprises providing a body of a nonlinear material and then passing a pulse of light through the body of nonlinear material, the pulse of light having a cross-sectional area corresponding to the cross-sectional area of the transient optical element to be created, the pulse of light having power sufficient to induce an index of refraction change over the portion of the body of nonlinear material through which it passes, the portion of the body of nonlinear material having the induced index of refraction change constituting the transient optical element and the duration of the transient optical element depending on the response time of the nonlinear material and the duration of the pulse of light.

An apparatus for creating a transient optical element according to the teachings of the present invention comprises a body of a nonlinear material and means for illuminating the body of nonlinear material with a pulse of light, the pulse of light having a cross-sectional area corresponding to the cross-sectional area of the transient optical element to be created, the pulse of light having power sufficient to induce an index of refraction change over the portion of the body of nonlinear material through which it passes, the portion of the body of nonlinear material having the induced index of refraction change constituting the transient optical element and the duration of the transient optical element depending on the response time of the nonlinear material and the duration of the pulse of light.

The change in index of refraction in the body of non-linear material may be produced as a result of absorption (i.e. t from optical heating) and/or from the third order nonlinear susceptability ($N_2$ KERR effect).

Transient optical circuits can be produced by creating a plurality of transient optical elements in accordance with this invention.

Transient optical elements that may be created according to this invention include prisms, lenses, gratings, beamsplitters, mirrors, waveguides and combinations of these elements.

Various features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structual changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a schematic showing a beam deflection system which includes a beam deflector created according to this invention and an input beam which is deflected by the transient beam deflector that is so created;

FIG. 2 is a schematic useful in determining the deflection angle for the beam deflector shown in FIG. 1;

FIG. 3 shows how beam focussing may be achieved in accordance with this invention;

DETAILED DESCRIPTION OF PREFERRED EMBODIMENTS

Figure 4A:
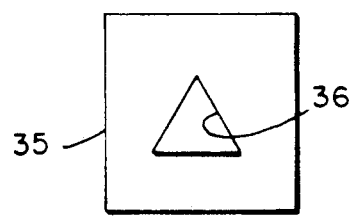
FIG. 4(a) is a plan view of the mask shown in FIG. 4.

The present invention is directed to the concept of creating a transient optical element by passing a pulse of light through a body of nonlinear material, with the pulse of light having sufficient power to induce a change in the index of refraction in the body of nonlinear material over that portion in the body of nonlinear material through which the pulse of light passes, the cross-sectional area of the pulse of light determining the type of transient optical element that is created. The pulse of light may be shaped, for example, so as to create a prism inside the nonlinear medium that will deflect a signal beam or so as to create a lens to focus a signal beam. The invention may be used in such applications as optical signal processing, optical signal modulation, spatial light modulation, resolving points or images and optical signal computation. The change in index of refraction in the body of nonlinear material may be caused by heat distribution caused by absorbtion of light within the nonlinear material and/or by third order non-linear susceptability ($N_2$ Kerr Effect).

Referring now to FIG. 1 there is shown a schematic illustrating a beam deflection system 10 according to this invention. In system 10 there is shown a body of a third order type nonlinear material 11, a pump beam 13, a signal (or input) beam 15 and a mask 17. Body 11 serves as the medium in which transient optical element is created and may be any third order nonlinear material such as cadmium selenide, glass, polymeres or liquid crystals. Pump beam 13, which is produced by a pump beam source 14, is the beam of light used to create the transient optical element in body 11 and signal beam 15 is the light beam which is to be processed (i.e. modu-lated or deflected etc.) by the transient optical element. Pump beam source 14 may be a pulse light source such as a YAG laser, a semiconductor laser or a Q-switched laser. Mask 17 is the element used to modify the cross-sectional area of pump beam 13 so as to produce a transient optical element of a desired shape and comprises a plate 17-1 of nontransparent material having an opening 17-2 (or transparent area) through which light can pass. Beams 13 and 15 overlap inside body of nonlinear material 11 at right angles to each other. Beam 15 is assumed to be plane wave. Beam 13 is area-modulated by mask 17 before entering nonlinear material 11. Beam 13 is more intense than beam 15, the intensity of beam 15 being such that it induces a negligble change in index of refraction of body 11 so as it passes through and the intensity of beam 13 being such that it induces a change in index refraction of body 11 over the portion of body 11 through which it passes.

Opening (or transparent area) 17-2 in mask 17 is in the shape of a triangle. The optical intensity $I(<E^2>)$ of beam 13 is used to induce an index of refraction change:

$$\Delta n = n^1 - n = n_2 <E^2> \tag{1}$$

where $n^1$ and $n_2$ denote the material refractive index with the presence of the beam 13 and the nonlinear index coefficient, respectively, and n denotes the material index of refraction without the presence of the pump beam. This induced refractive index change causes an induced transient triangularly shaped prism 18 to be formed in nonlinear material 11. As can be appreciated, input beam 15 as it passes through the induced prism, will undergo a direction change because of the transient prism, that is, induced transient deflection will occur. In FIG. 1, input beam 15 is shown in dotted line after it passes through nonlinear material 11 in the absence of the transient prism and in the presence of the transient prism by solid lines.

As noted above, the change in index of refraction may be produced as a result of absorption of light from temperature change in the body of nonlinear material and/or by third order nonlinear susceptability ($N_2$ Kerr effect).

To calculate the deflection angle, in the example shown in FIG. 1 consider the geometry in the schematic shown in FIG. 2. The apex angle of the isosceles triangle is $\alpha$. The deflection angle is $\gamma$. The refractive indices of the modulated and unmodulated area are n" and n, respectively. The use of Snell's law show relation.

$$\frac{n^1}{n} = \frac{\sin\left[\frac{\alpha}{2} + \sin^{-1}\left(\frac{\sin\gamma/2}{n}\right)\right]}{\sin\alpha/2} \tag{2}$$

Eq. (2) can be simplified by letting sin y and y for a small y. This approximation leads to $$\gamma \approx \frac{L\Delta n}{D} \tag{3}$$

where L and D are the triangle's base and height, respectively. For a Gaussian probe beam $S_1$, its far field diffraction angle is $$\gamma_{beam} = \frac{\lambda}{\pi \omega_o} \tag{4}$$

where $\lambda$ and $\omega_o$ are the S beam's wavelength and spot size, respectively. Thus, in the far field, as many as $$N = \frac{\gamma}{\gamma_{BEAM}} = \frac{\pi L \Delta n \omega_o}{D\lambda} \quad (5)$$

resolvable points can be obtained. Let $L/D = 5$, $\omega_o = 5$ mm, and $\lambda = 532$ nm. Eq. (5) results in $N = 1.4 \cdot 10^5$ n. Since it is not difficult to obtain the induced index of refraction change around the order of $10^{-4}$ with a picosecond laser pulse and various polymeric and semiconductor material, an ultrafast deflector with a number of resolvable deflection angles can be implemented.

To decrease the pump signal's optical power, by sacrificing the deflection speed, various photorefractive, semiconductor, as well as liquid crystal materials can be used. It has been reported that liquid crystal material can produce a $\Delta n = 10^{-1}$ change using energy density of 1 $\mu$J/cm$^2$.

For CS$_2$: From $\chi^3$ Kerr Index $$n_2 = 1.2 \cdot 10^{-11} \text{ esu}$$

$$n' - n = 5.6 \cdot 10^{-5} \text{ for } I = 2.6 \text{ GW/cm}^2$$

For CS$_2$ For Thermal $$\Delta n = n' - n = -\frac{dn}{dt} \left( \frac{F \omega \alpha}{2 P C_v} \right) = \frac{\gamma n}{\gamma T} \Delta T$$

$$\Delta n = 1 \cdot 10^{-3} \text{ for } F = 0.85 \text{ mj}$$

where $$\alpha = 0.22 \text{ cm}^{-1}$$
absorption coeff and $\Delta T$ is the temperature rise In addition to the triangularly shaped pump beam as shown in FIG. 1, for producing a triangular prism shaped deflector, other shapes, such as circular, elliptical and rectangular can be used to obtain beam focusing, defocusing, diffraction, as well as phase-front control and aberration correction. Also a stepped shape beam can be used to create a grating and rectangular shapes used to redirect or split a signal beam.

In FIG. 3 an induced, area-modulated beam focusing scheme is shown. Before entering nonlinear medium, the pump beam (not shown) is area modulated using a mask having an elliptical shaped opening (not shown) so as to create lens with the front and back radii of $R_1$ and $R_2$. When the material is so modulated, the simultaneous arrival of the (input) S beam will produce a one dimensional quadratic phase change. In this case, the output of S is $$S(x) = \exp(jkn^1 d)\exp\left[ -j\frac{k}{2} \Delta n \left( \frac{1}{R_1} - \frac{1}{R_2} \right) x^2 \right] \quad (6)$$

where d is the separation between two spherical surfaces along the propagation direction. It can be shown that depending on $R_1$ and $R_2$ $S(x,y)$ can either converge or diverge, i.e. undergoing an induced lensing effect. By comparing Eq. (6) with a standard lens equation, the focal length f of the induced lens can be expressed as $$f_{induced} = \frac{R_1 R_2}{\Delta n(R_2 - R_1)} \quad (7)$$

Thus, by using different modulating radii, induced either focusing or defocusing which is important for dynamic signal processing can be performed.

Figure 4:
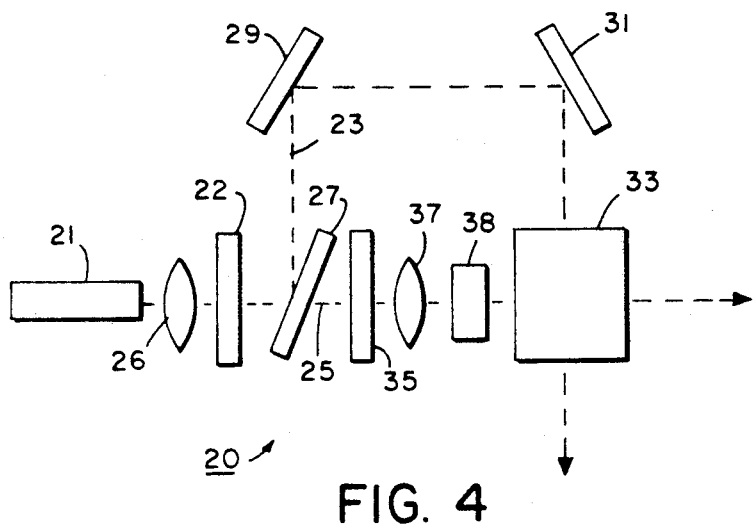
FIG. 4 is a schematic of an optical system constructed using the teachings of this invention.

Referring now to FIG. 4 there is shown an optical system constructed according to the teachings of this invention and identified by reference numeral 20.

A light pulse from a source 21 is expanded by a beam expander 21-1 and then is passed through a spatial filter 22 which serves to make its intensity uniform in cross section. Light pulse is then split into two parts 23 and 25 by a beamsplitter 27, part 23 constituting a signal (or input) beam and part 25 constituting a pump beam. Beamsplitter 27 is designed so that the intensity of part 23 is much less than the intensity of part 25. For example, the intensity of part 23 may be 10% that of part 25. Part 23 is directed by mirrors 29 and 31 through body 33 of nonlinear material. Part 25 is passed through a mask 35 which modulates its cross-sectional area, through optics 37 and then passes through body 33 intersecting with pulse part 23 at right angles thereto. Optics 37 serves to sharpen the light pulse passing through mask 35 and brings the light pulse to focus inside nonlinear medium. Part 25 induces an index change in body 29 over the portion of body 33 through which it passes, with the portion of body 33 having the index change being shaped to define an optical element. The duration of the optical element so produced is a convolution of intensity of pulse part 25 and the response time of the nonlinear material used for body 33. The shape of the transient optical element is defined by the shape of the opening 37 in mask 35. Mask 35, which is shown in plan view in FIG. 4(a), has a triangularly shaped opening 36 as shown in FIG. 4(a) which will result in the creation of an induced triangularly shaped prism.

Body 33 is a third order nonlinear material. Examples of such materials are cadmium selenide, glass, organic polymers and liquid crystals. Body 33 may be doped with an absorbing material so as to produce an index change as a result of temperature change from absorption rather than index change caused by third order nonlinear susceptibility (N$_2$ Kerr effect) or in addition thereto.

Source 21 may be a pulse laser such as a mode locked YAG laser, a semiconductor laser or a Q switched laser. A delay unit 38 may be disposed along the path of beam port 25 to insure that the two beams intersect within the body of non-linear material.

Figure 5:
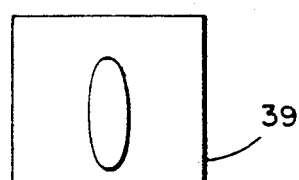
FIGS. 5 through 14 are plan views of examples of other masks that may be made in accordance with this invention.
Figure 10:
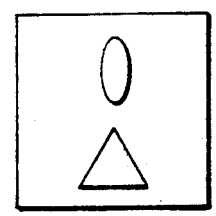
Figure 6:
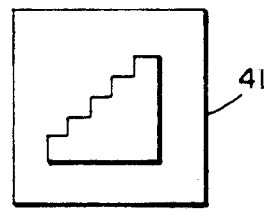
Figure 11:
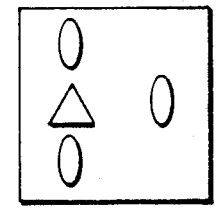
Figure 7:
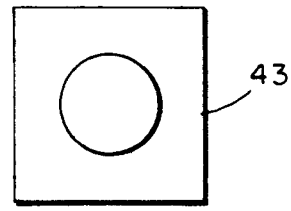
Figure 8:
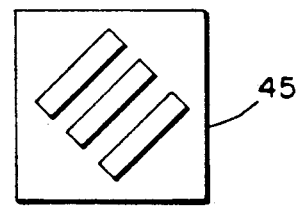

As can be appreciated, masks having openings other than the triangular shape shown in FIG. 4(a) can be employed. As examples, the mask can have an elliptically shaped opening such as in mask 39 in FIG. 5 so as to induce (i.e. create) a transient lens, a stepped shape opening such as shown in mask 41 in FIG. 6 so as to induce a transient grating, a circular shaped opening such as shown by mask 43 in FIG. 7 to induce a transient spherical lens, a plurality of spaced rectangular openings such as shown in mask 45 in FIG. 8 to induce a transient beamsplitter or a transient mirror or a plurality of openings arranged in various ways such as, as examples, shown in FIGS. 9-14 so as to induce different types transient optical circuits.

Figure 12:
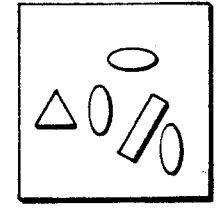
Figure 13:
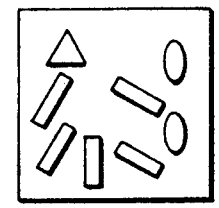
Figure 9:
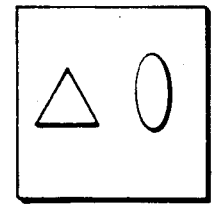
Figure 14:
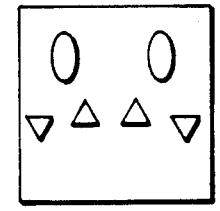
Figure 15:
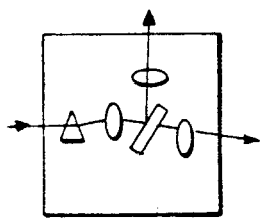
FIGS. 15-17 show how input beams are modulated using optical circuits created by the masks shown in FIGS. 11-14, respectively.
Figure 16:
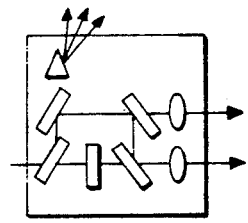
Figure 17:
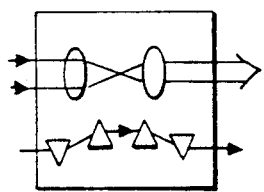

FIGS. 15-17 show how input beams are processed as they pass through the nonlinear medium having optical circuits created using the masks of FIGS. 12-14.

Figure 18:
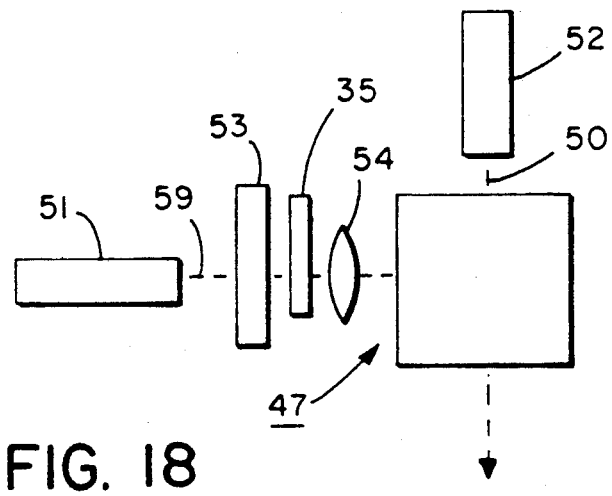
FIG. 18 is a schematic of a modification of the system shown in FIG. 4.

In FIG. 18 there is shown a modification of the system shown in FIG. 4, the modified system being identified by reference numeral 47. System 47 as shown in FIG 18 differs from system 20 shown in FIG. 4 in that the pump and input beams 49 and 50, respectively are produced from separate sources 51 and 52 rather from a single source 21. The intensity of beam 50 is much less than that of beam 49. A spatial filter 53 and optics 54 (similar to optics 37) are disposed along the path of beam 49.

Figure 19:
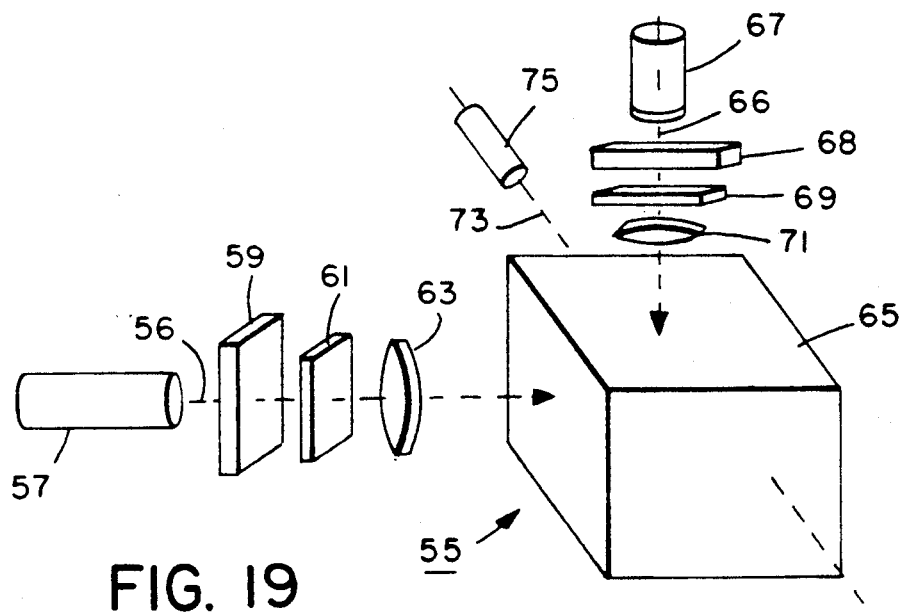
FIG. 19 is a schematic of another modification of the system shown in FIG. 4.

In FIG. 19 there is shown in perspective view a system according to this invention which includes two orthogonal pump pulses which interact in a nonlinear medium, the system being identified by reference numeral 55. A first pulse of light 56 from a source 57, such as a YAG laser is passed through a spatial filter 59 for making its intensity uniform and a mask 61 having an elliptically shaped opening and optics 63 and then passes through nonlinear medium 65, optics 63 serving to sharpen the pulse and bring it to focus in nonlinear medium 65.

A second pulse of light 66 from a source 67, which is identical to source 57 is passed through a spatial filter 68, a mask 69 and optics 71, which are identical to spatial filter 59, mask 61 and optics 63, respectively and then passes through nonlinear medium 65 intersecting the first pulse of light at right angles thereto. Each one of the two pulses has sufficient power to induce a change in the index of refraction in nonlinear medium 65. The combined action of the two pump pulses 56 and 66 induces a spherical lens in nonlinear medium 65. An input pulse 73 from source 75 on passing through nonlinear medium 65 at right angles to the two pump pulses and during the time in which the induced lens is created will be focussed by the induced lens. Pulse 73 is sufficiently weak so that the index change it produces in nonlinear medium 65 is negligable.

Figure 20:
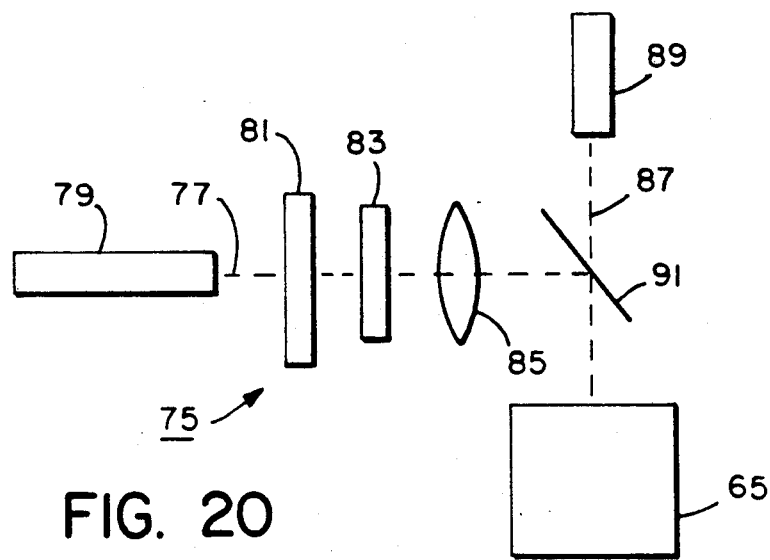
FIG. 20 is a schematic of another modification of the system shown in FIG. 4.

Referring now to FIG. 20 there is shown an embodiment of the invention identified by reference numeral 75 in which the pump and signal beams are coaxial. A pump pulse 77 from a source 79 is passed through a spatial filter 81, a mask 83 which may be for example triangularly shaped, focussing and sharpening optics 85 and then combined with an input pulse 87 from a source 89 by means of a beamsplitter 91 and is then directed through a nonlinear medium.

Figure 21:
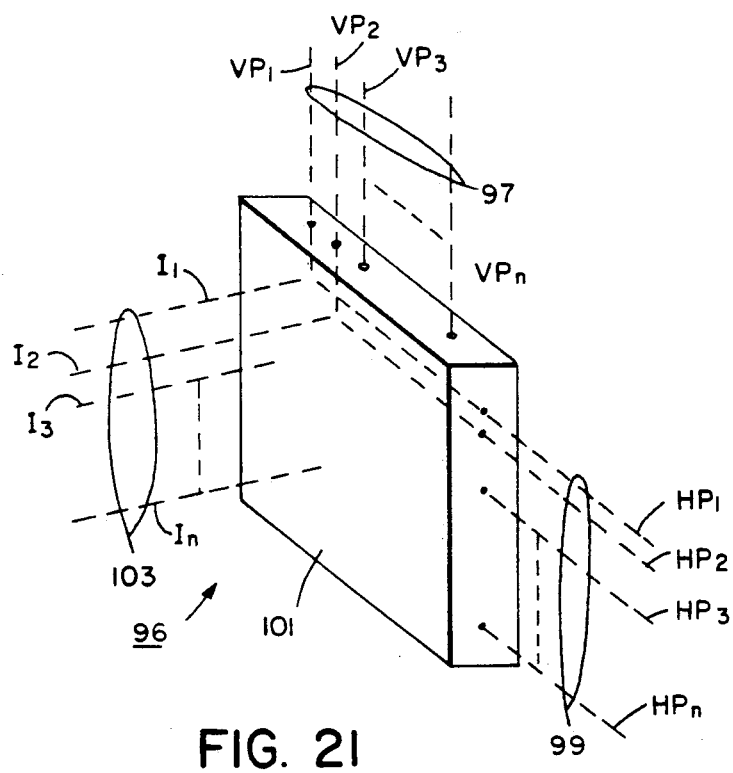
FIG. 21 is a simplified schematic of a spatial light modulator constructed according to this invention.

Referring now to FIG. 21 there is shown a 2-dimensional (2-d) spatial light modulator according to this invention. A set 97 of n vertically directed pump pulses labelled $VP_1$, $VP_2$, $VP_3$, $VP_n$, etc. and a set 99 of n horizontally directed pump pulses labelled $HP_1$, $HP_2$, $HP_3$, $HP_n$, etc. intersect in a nonlinear medium 101. A set of $n^2$ input pulses labelled $I_1$, $I_2$, $I_3$, $I_n$ also passes through nonlinear medium 101 with each one of the input pulses passing through the intersection of one of the vertically directed pump pulse 97 with one of the horizontally direct pump pulses 99. Each pump pulse is shaped in cross section to induce the formation of a focussing lens. As can be appreciated, the intersection of two pump pulses (i.e. a horizontal pump pulse with a vertical pump pulse) will induce a spherical lens that will focus its associated input pulse to a spot. On the other hand, if only one of the pump pulses (i.e. such as the horizontal pulse) is present, then the input pulse will be focussed as a line (i.e. one dimensionally).

The embodiments of the present invention is intended to be merely exemplary and those skilled in the art shall be able to make numerous variations and modifications to it without departing from the spirit of the present invention. All such variations and modifications are intended to be without the scope of the present invention as defined in the appended claims.

What is claimed is:

1. A method of creating a transient optical element comprising:
  a) providing a body of a nonlinear material, and
  b) passing an area modulated beam of light of uniform intensity through the body of nonlinear material, the area modulated beam of light having a cross-sectional area corresponding to the cross-sectional area of the transient optical element to be created, the area modulated beam of light having power sufficient to induce an index of refraction change over the portion of the body of nonlinear material through which the beam of light passes, the portion of the body of nonlinear material having the induced index of refraction change constituting the transient optical element, the duration of the transient optical element depending on the response time of the nonlinear material and the duration of the area modulated beam of light.

2. Apparatus for creating a transient optical element comprising:
  a) means for producing an area modulated beam of light of uniform intensity, and
  b) a body of a nonlinear material disposed along the path of said area modulated beam of light,
  c) said area modulated beam of light having a cross-sectional area corresponding to the cross-sectional area of the transient optical element to be created, said area modulated beam of light having power sufficient to induce an index of refraction change over the portion of the body of nonlinear material through which the are modulated beam of light passes, the portion of the body of nonlinear material having the induced index of refraction change constituting the transient optical element, the duration of the transient optical element depending on the response time of the nonlinear material and the duration of the area modulated beam of light.

3. The apparatus of claim 2 and wherein the cross-sectional area of the area modulated beam of light is in the shape of a triangle for use in inducing the creation of a prism or a beamsplitter.

4. The apparatus of claim 2 and wherein the cross-sectional area of the area modulated beam of light is in the shape of an ellipse for use in inducing the creation of a lens.

5. The apparatus of claim 2 and wherein the cross-sectional area of the area modulated beam of light is in the shape of a plurality of steps for use in inducing the creation of a grating.

6. The apparatus of claim 2 and wherein the cross-sectional area of the area modulated beam of light is in the shape of a one or more rectangules for use in inducing the creation of a waveguide.

7. The apparatus of claim 2 and wherein the cross-sectional area of the area modulated beam of light is in the shape of a circle.

8. The apparatus of claim 2 and wherein the means for producing an area modulated beam of light includes a light source for generating a beam of light and a mask for masking off a portion of said beam of light.

9. The apparatus of claim 8 and further including a beam expander for expanding the light beams.

10. The apparatus of claim 8 and wherein the light source comprises a mode locked YAG laser or a semiconductor laser or a Q-switched laser.

11. The apparatus of claim 2 and wherein the nonlinear material is a third order nonlinear material.

12. The apparatus of claim 2 and wherein the means for producing an area modulated beam of light comprises a light source for producing a beam of light and a mask disposed for area modulating said beam of light.

13. Apparatus for creating a transient optical element comprising:
   a) a body of a nonlinear material,
   b) means for illuminating the body with a beam of light, and
   c) a mask for masking the beam of light before it strikes the body, the mask having a cross-sectional area corresponding to the cross-sectional area of the transient optical element to be created, the beam of light having power sufficient to induce an index of refraction change over the portion of the body of nonlinear material through which the beam passes, the portion of the body of nonlinear material having the induced index of refraction change constituting the transient optical element, the duration of the transient optical element depending on the nonlinear material and the beam of light.

14. A method of creating a transient optical circuit, the transient optical circuit comprising a plurality of transient optical elements, the method comprising:
   a. providing a body of a nonlinear material, and
   b. passing a plurality of beams of light through the body of nonlinear material, each through a different portion, each one of the beams of light having a cross-sectional area corresponding to the cross-sectional area of one of the transient optical elements to be created, each one of the beams of light having power sufficient to induce an index of refraction change over the portion of the body of nonlinear material through which the beam passes, the portion of the body of nonlinear material having the induced index of refraction change constituting the transient optical element with the duration of the transient optical element depending on the nonlinear material and the particular beam of light.

15. Apparatus for creating a transient optical circuit comprising:
   a. means for producing a beam of light,
   b. a body of nonlinear material disposed along the path of the beam of light, and
   c. a mask disposed along the path of the beam of light in front of the body of nonlinear material for area modulating the beam of light, the mask having a plurality of discrete shapes, each corresponding to the cross-section of an optical element to be created.

16. The apparatus of claim 15 and further including a spatial filter for making the beam uniform in intensity.

* * * * *